United States Patent
Kobayashi et al.

(10) Patent No.: US 11,023,562 B2
(45) Date of Patent: Jun. 1, 2021

(54) ANALYSIS METHOD, ANALYSIS DEVICE, AND RECORDING MEDIUM

(71) Applicant: FUJITSU LIMITED, Kawasaki (JP)

(72) Inventors: Ken Kobayashi, Setagaya (JP); Yuhei Umeda, Kawasaki (JP); Masaru Todoriki, Kita (JP); Hiroya Inakoshi, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/028,915

(22) Filed: Jul. 6, 2018

(65) Prior Publication Data

US 2019/0012297 A1 Jan. 10, 2019

(30) Foreign Application Priority Data

Jul. 7, 2017 (JP) .............................. JP2017-133558

(51) Int. Cl.
*G06F 17/18* (2006.01)
*G06F 17/16* (2006.01)
*G06K 9/00* (2006.01)

(52) U.S. Cl.
CPC .............. *G06F 17/18* (2013.01); *G06F 17/16* (2013.01); *G06K 9/00496* (2013.01)

(58) Field of Classification Search
CPC .................................................. G06K 9/00496
See application file for complete search history.

(56) References Cited

U.S. PATENT DOCUMENTS

| 2008/0140751 A1 | 6/2008 | Ide et al. |
| 2008/0243437 A1 | 10/2008 | Ide et al. |
| 2011/0274340 A1* | 11/2011 | Suzuki .................. G06T 7/0012 382/133 |
| 2017/0147946 A1 | 5/2017 | Umeda |

FOREIGN PATENT DOCUMENTS

| JP | 2008-146353 | 6/2008 |
| JP | 2017-97643 A | 6/2017 |

OTHER PUBLICATIONS

Wolfram Mathworld, http://mathworks.wolfram.com/bettinumber.html, 2016 (Year: 2016).*
S. Wienberger, What is . . . Persistent Homology?, Notices of the AMS, vol. 58, No. 1, p. 36-39, 2011 (Year: 2011).*
C.M.M. Pereira et al., Persistent homology for time series and spatial data clustering, Expert Systems with Applications 42, p. 6026-6038, 2015 (Year: 2015).*

(Continued)

*Primary Examiner* — Aimee Li
*Assistant Examiner* — Emily A Larocque
(74) *Attorney, Agent, or Firm* — Xsensus LLP

(57) ABSTRACT

A non-transitory computer-readable recording medium stores therein an analysis program that causes a computer to execute a process including: dividing a Betti number sequence into a plurality of Betti number sequences, the Betti number sequence being included in a result of a persistent homology process performed on time series data, the plurality of Betti number sequences corresponding to different dimension of the Betti number sequence; and performing an analysis on each of the plurality of Betti number sequences.

5 Claims, 18 Drawing Sheets

(56) References Cited

OTHER PUBLICATIONS

G. Singh et al., Topological analysis of population activity in visual cortex, Journal of Vision, 8(8): 11 p. 1-18, 2008 (Year: 2008).*
Y. Dabaghian, et al., A Topological Paradigm for Hippocampal Spatial Map Formation Using Persistent Homology, PLOS Computational Biology, vol. 8, Issue 8, p. 1-14, 2012 (Year: 2012).*
Y. Mohammad et al., Robust Singular Spectrum Transform, IEA/AIE, LNAI 5579, p. 123-132, 2009 (Year: 2009).*
H. Adams, et al., javaPlex: A Research Software Package for Persistent (Co)Homology, ICMS 2014, pp. 129-136, 2014 (Year: 2014).*
Y. Umeda, Topological Data Analysis and its Application to Time-Series Data Analysis, Fujitsu Scientific and Technical Journal, vol. 55, No. 2, p. 65-71, 2019 (Year: 2019).*
D. Patterson et al., Computer Organization and Design, the Hardware/Software Interface, Elsevier, 3rd ed., 2005 (Year: 2005).*
T. Mitsa, Temporal Data Mining, Chapman & Hall CRC Press, 2010 (Year: 2010).*
Umeda, Y., "Time Series Classification via Topological Data Analysis," Transactions of the Japanese Society for Artificial Intelligence, No. 32, vol. 3, 2017, 12 Pages.
Japanese Office Action dated Apr. 13, 2021 in corresponding Japanese Patent Application No. 2017-133558.

* cited by examiner

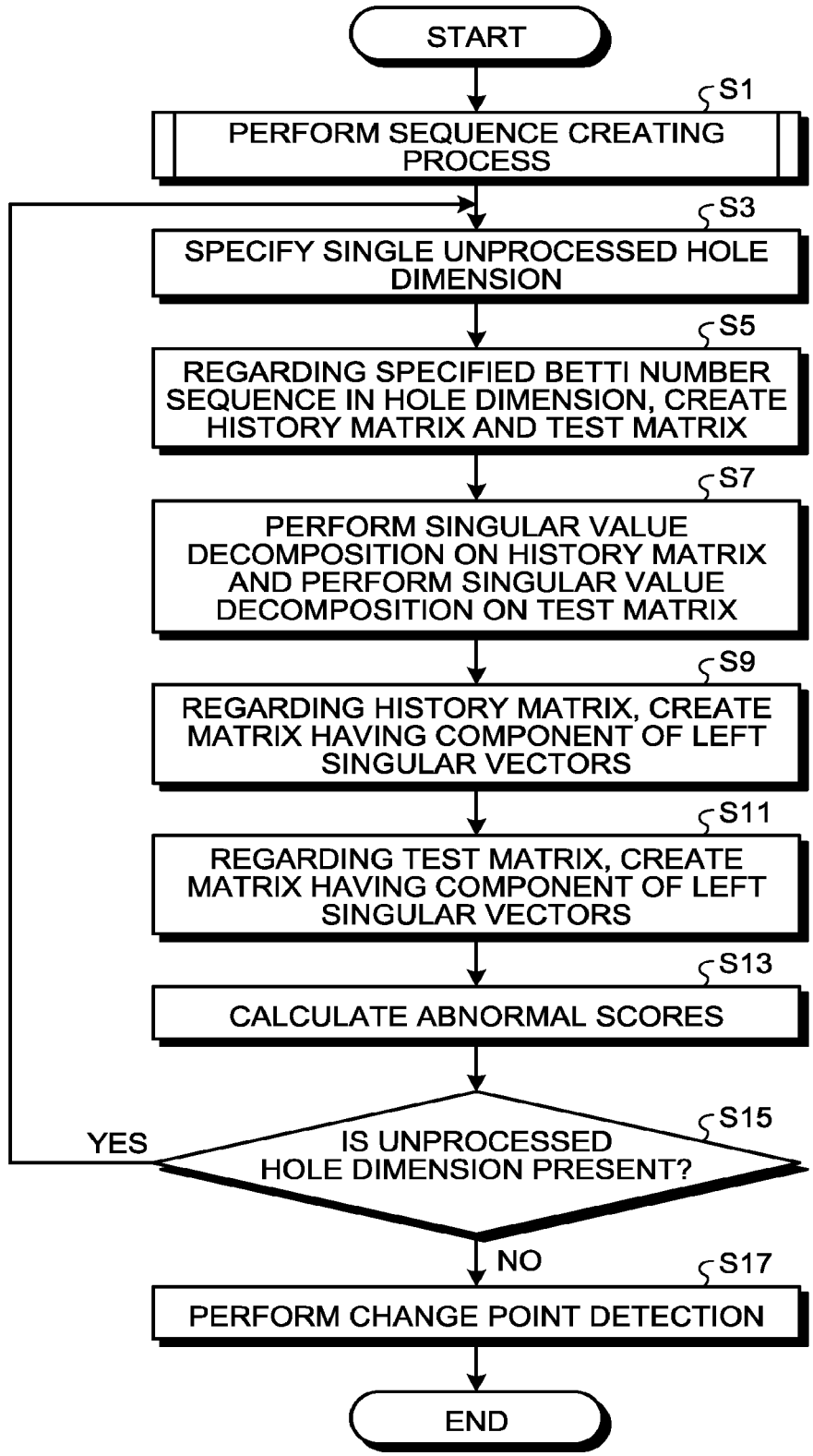

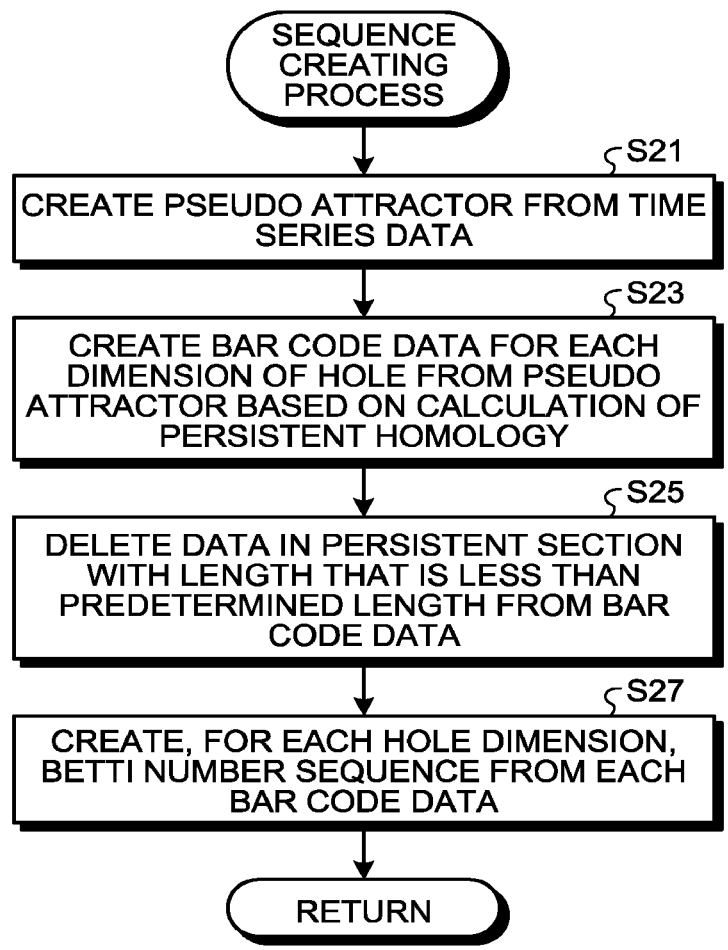
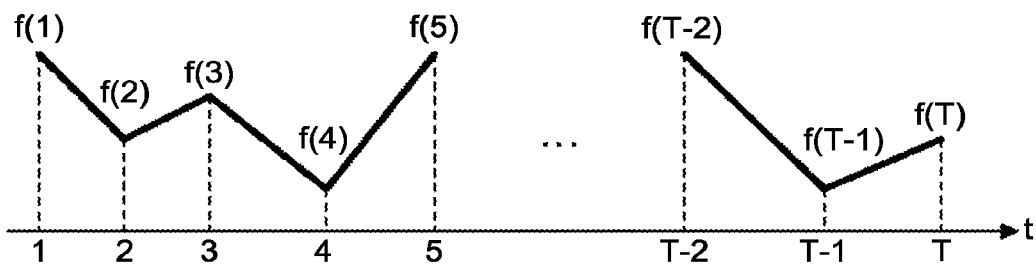

| DIMENSION | GENERATED RADIUS | VANISHED RADIUS |
|---|---|---|
| 1 | 0.10 | 0.12 |
| 1 | 0.11 | 0.14 |
| 1 | 0.12 | 0.13 |
| 1 | 0.12 | 0.15 |
| ⋮ | ⋮ | ⋮ |

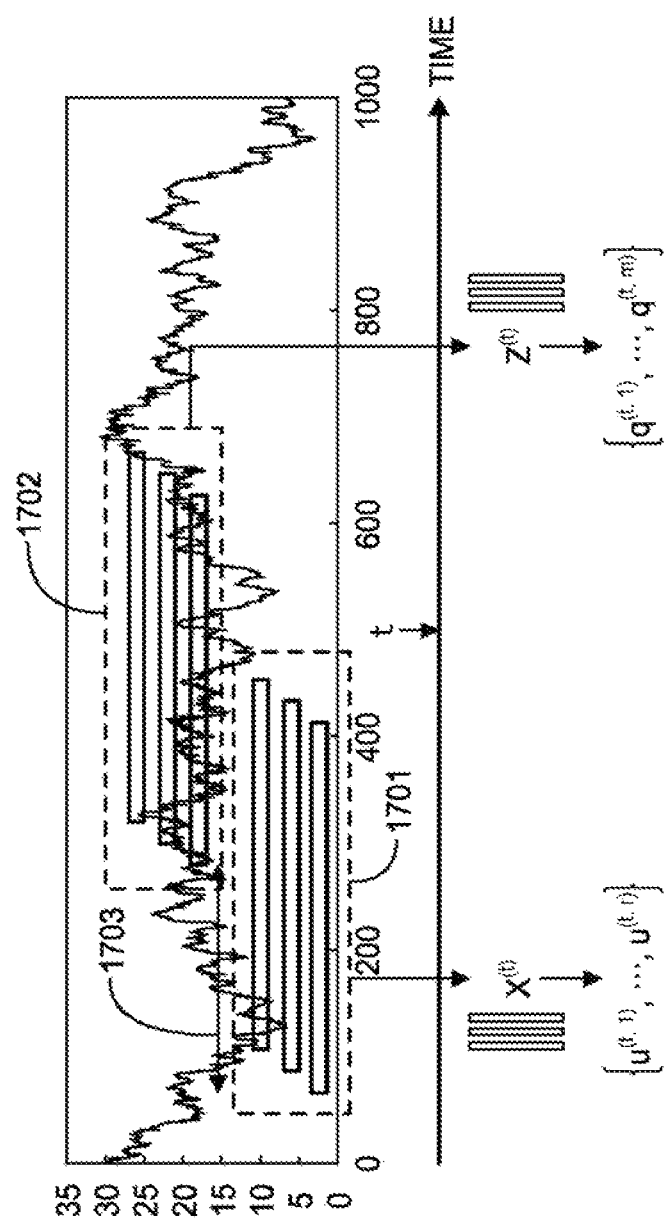

ANALYSIS METHOD, ANALYSIS DEVICE, AND RECORDING MEDIUM

CROSS-REFERENCE TO RELATED APPLICATION

This application is based upon and claims the benefit of priority of the prior Japanese Patent Application No. 2017-133558, filed on Jul. 7, 2017, the entire contents of which are incorporated herein by reference.

FIELD

The embodiments discussed herein are related to an analysis technology for time series data.

BACKGROUND

There is time series data having chaotic characteristics (for example, data measured by a gyro sensor, data on stock prices, and the like).

For example, as data on stock prices, it is assumed that the time series data illustrated in FIG. 1 has been obtained. FIG. 1 is a diagram illustrating time series data of a logarithmic difference about closing stock prices of a certain brand. The logarithmic difference mentioned here means a difference between the logarithm of the closing stock price on a certain day and the logarithm of the closing stock price on the previous day.

FIG. 2 is a diagram illustrating abnormal scores calculated by performing singular spectrum transformation performed on a logarithmic difference sequence of the stock prices illustrated in FIG. 1. In the example illustrated in FIG. 2, the abnormal scores are changed at a relatively high price. In such a case, it is difficult to detect a change point from the time series data due to influence of noise or the like.

Furthermore, as an analysis technology for time series data, there is a known technology for transforming time series data to a Betti number sequence based on a phase data analysis.

Non-Patent Document 1: Yuhei Umeda, "Time Series Classification via Topological Data Analysis", Transactions of the Japanese Society for Artificial Intelligence, No. 32, Vol. 3, May 1, 2017

In the analysis of time series data performed by using the related technology described in Non-Patent Document 1, for example, regarding time series data having chaotic characteristics, in some cases, an appropriate analysis result is not able to be obtained due to influence of noise. Namely, depending on time series data, there may be a case in which a time series analysis is not possible.

SUMMARY

According to an aspect of the embodiment, a non-transitory computer-readable recording medium stores therein an analysis program that causes a computer to execute a process including: dividing a Betti number sequence into a plurality of Betti number sequences, the Betti number sequence being included in a result of a persistent homology process performed on time series data, the plurality of Betti number sequences corresponding to different dimension of the Betti number sequence; and performing an analysis on each of the plurality of Betti number sequences.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a flowchart illustrating the processing flow of a process performed by the analysis device according to a first embodiment;

FIG. 9 is a flowchart illustrating the processing flow of a sequence creating process;

FIG. 10 is a diagram illustrating creation of a pseudo attractor;

FIG. 17 is a diagram illustrating singular spectrum transformation;

DESCRIPTION OF EMBODIMENTS

Preferred embodiments will be explained with reference to accompanying drawings. The present invention is not limited to the embodiments.

[a] First Embodiment

Figure 1:
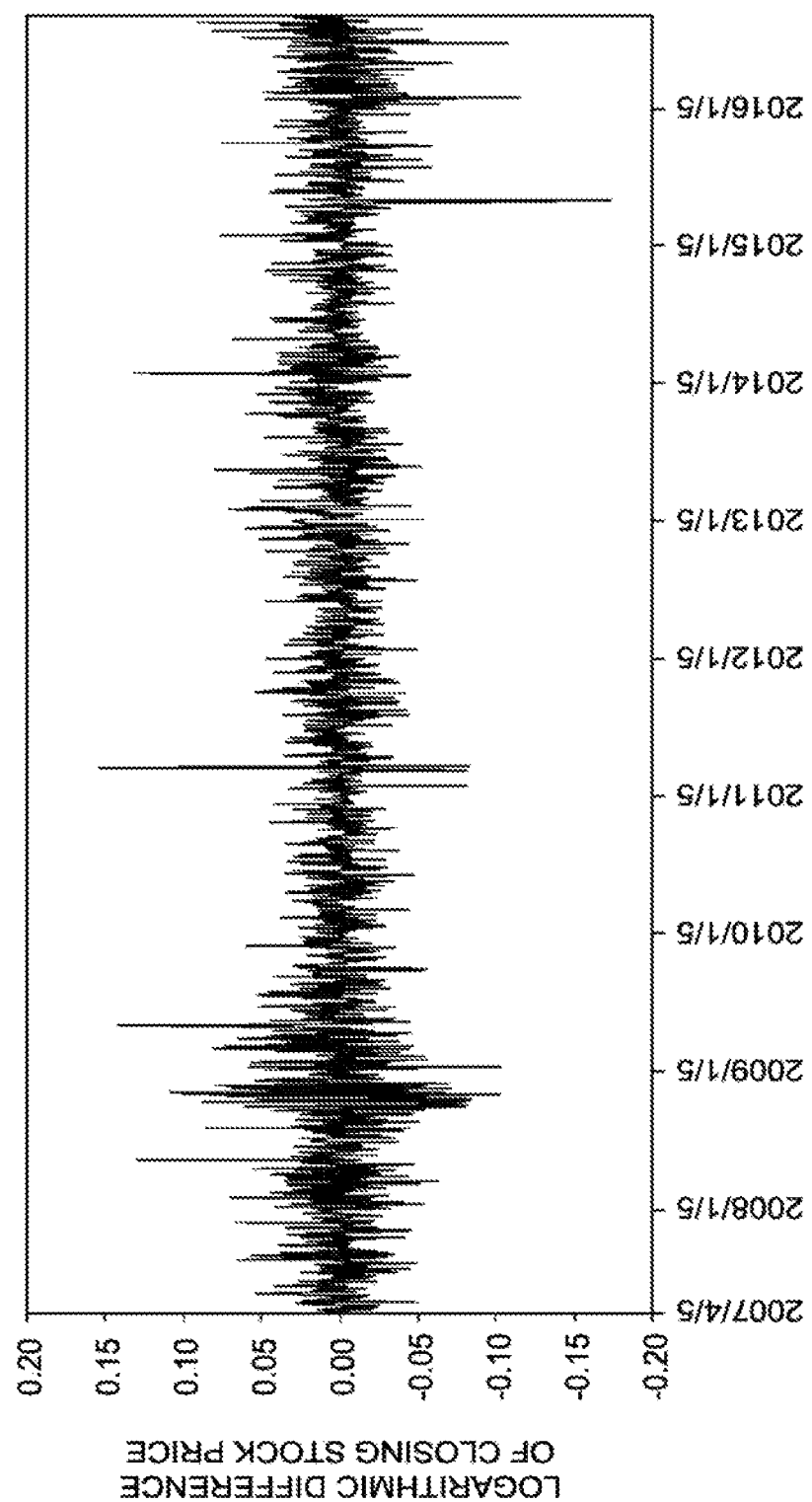
FIG. 1 is a diagram illustrating a logarithmic difference sequence of stock prices.
Figure 3:
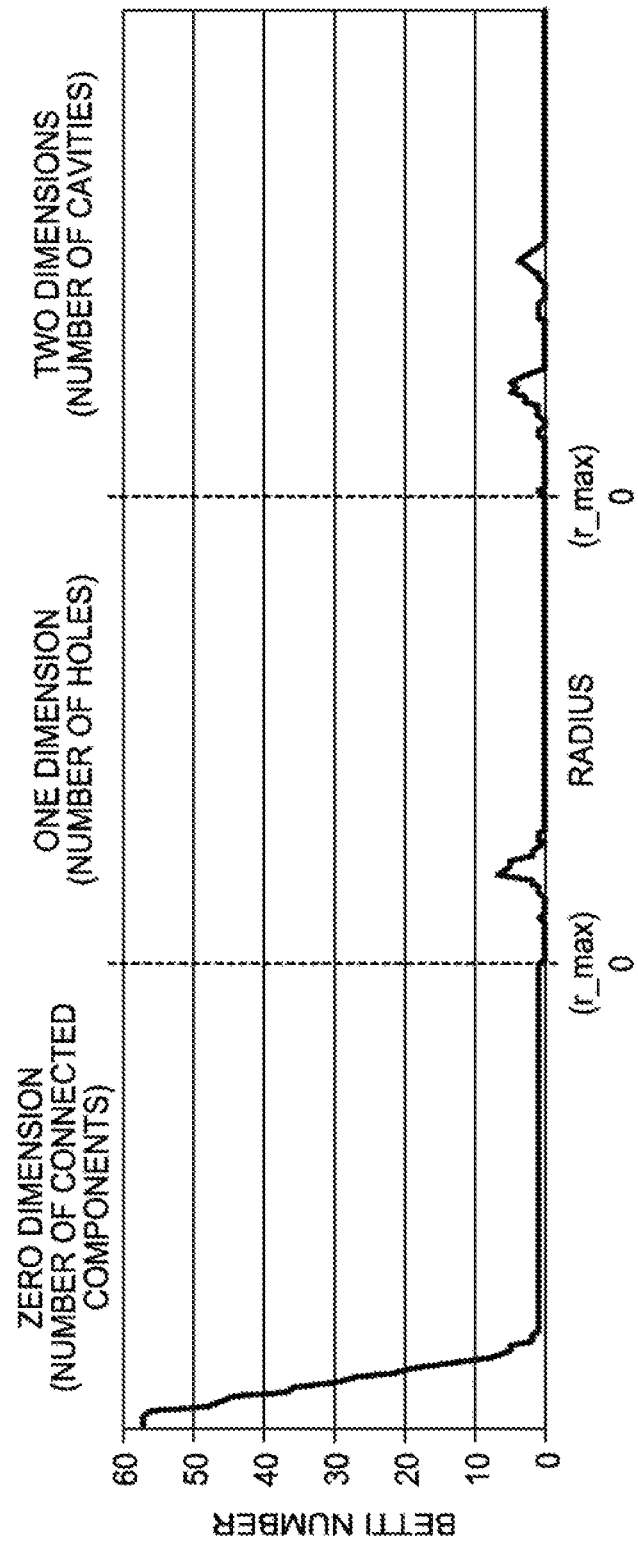
FIG. 3 is a diagram illustrating a Betti number sequence created from the logarithmic difference sequence of the stock prices.

FIG. 3 is a diagram illustrating a Betti number sequence created from the logarithmic difference sequence illustrated in FIG. 1 performed by using the technology described in Non-Patent Document 1. In FIG. 3, the values on the vertical axis represent the Betti numbers and the values on the horizontal axis indicate the radii. In the Betti number sequence illustrated in FIG. 3, the Betti number sequence about zero dimension, the Betti number sequence about one dimension, and the Betti number sequence about two dimensions are connected. The radius of each of the Betti number sequences is from zero to r_max. In a persistent homology process, because the radius of a sphere is increased in accordance with elapse of time, the Betti number sequence about zero dimension represents a time series variation in the number of connected components, the Betti number sequence about one dimension represents a time series variation in the number of holes (i.e., tunnels), and the Betti number sequence about two dimensions represents a time series variation in the number of cavities.

Figure 4:
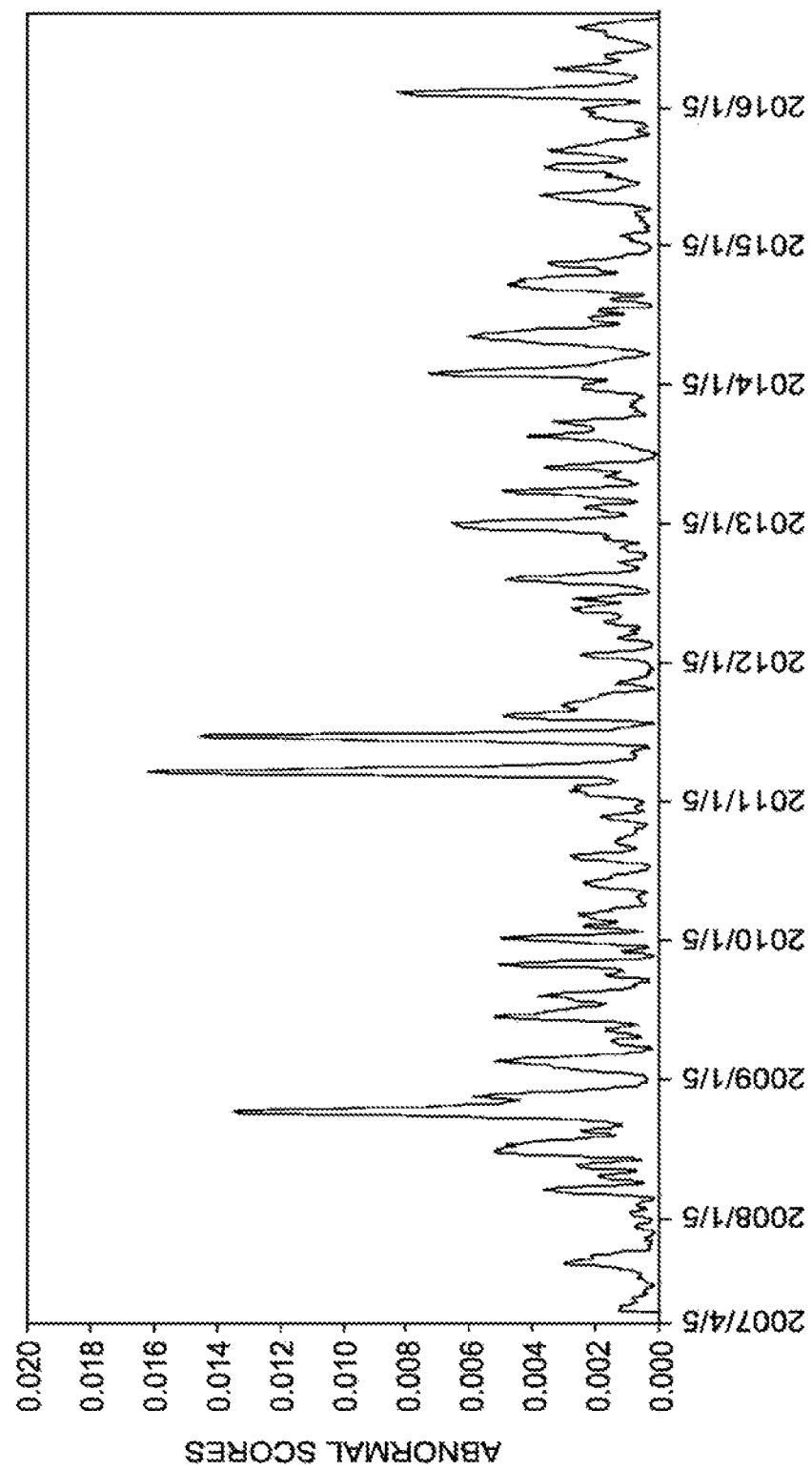
FIG. 4 is a diagram illustrating abnormal scores.

When performing singular spectrum transformation on the Betti number sequences illustrated in FIG. 3, the abnormal scores illustrated in FIG. 4 are calculated. In FIG. 4, the values on the vertical axis represent abnormal scores and the values on the horizontal axis represent the date and time.

Figure 5:
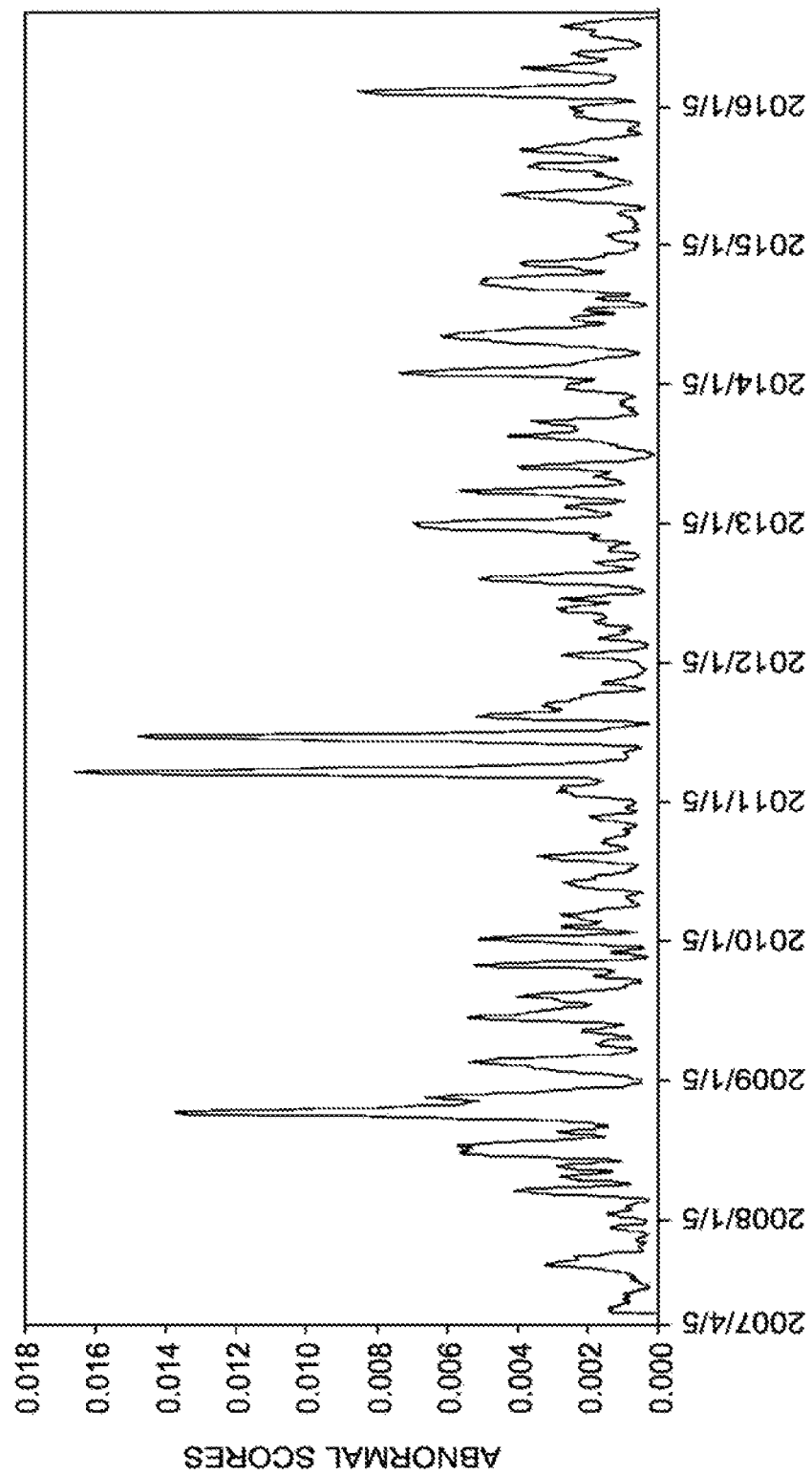
FIG. 5 is a diagram illustrating abnormal scores about zero dimension.
Figure 6:
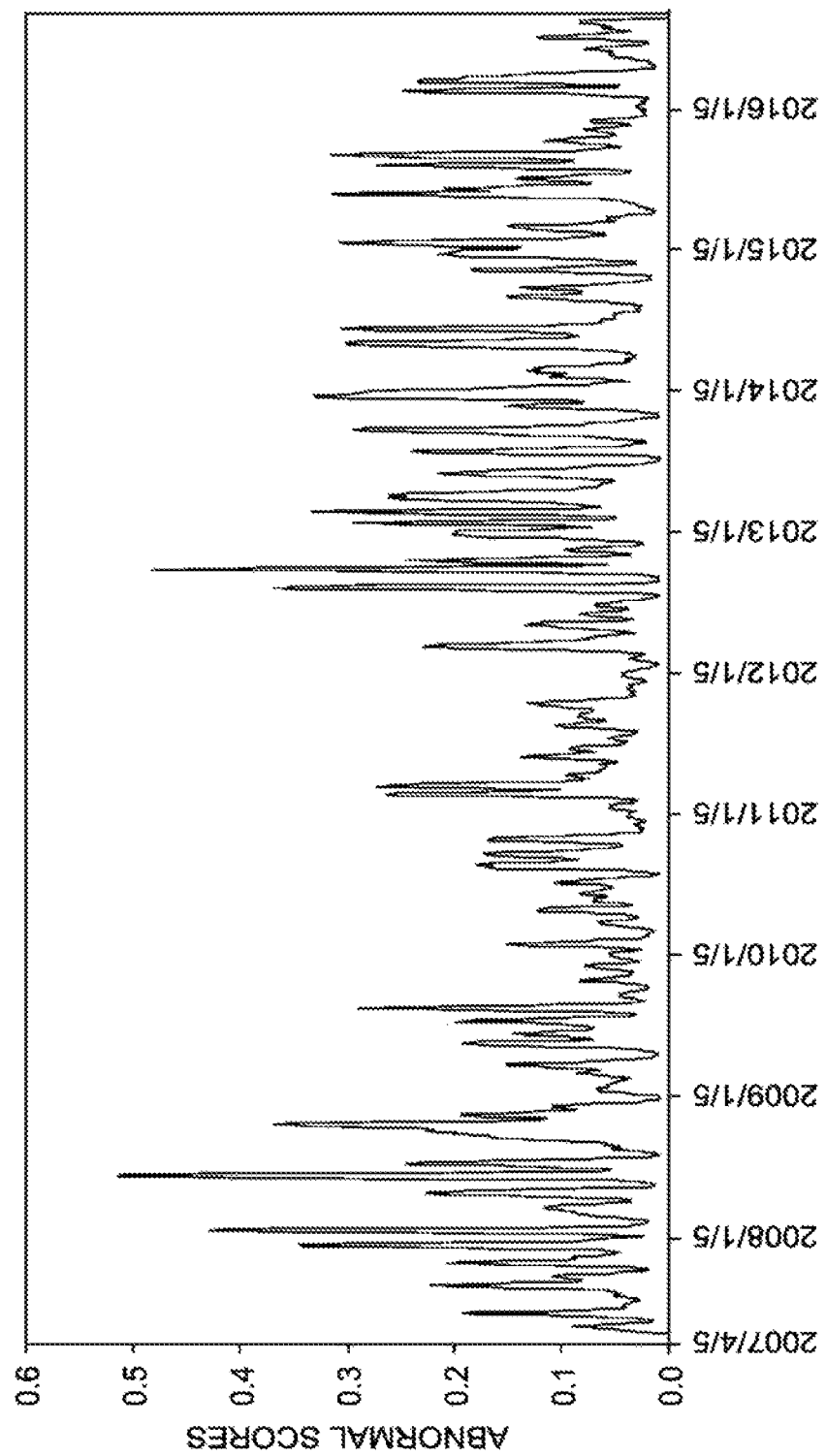
FIG. 6 is a diagram illustrating abnormal scores about one dimension.

In contrast, FIGS. 5 and 6 illustrate the result obtained when singular spectrum transformation is performed on each of the Betti number sequences obtained by dividing the Betti number sequence illustrated in FIG. 3 into each dimension. FIG. 5 is a diagram illustrating abnormal scores about zero dimension and FIG. 6 is a diagram illustrating abnormal scores about one dimension. In FIGS. 5 and 6, the values on the vertical axis represent abnormal scores and the values on the horizontal axis represent the date and time.

Based on the comparison between FIGS. 4 and 5 and FIG. 6, it is found that the abnormal scores illustrated in FIG. 4 and the abnormal scores illustrated in FIG. 5 are substantially the same. This means that the scale of the values of the Betti number sequence about zero dimension is greater than the values of the Betti number sequence about the other dimensions and thus the values of the Betti number sequence about the other dimensions are not reflected in the calculation result of the abnormal scores. Consequently, there may be a case in which an appropriate change point is not able to be detected from the abnormal scores illustrated in FIG. 4.

Thus, in the embodiment described below, an appropriate change point is allowed to be detected by performing change point detection on each of the Betti number sequences divided for each dimension.

Figure 7:
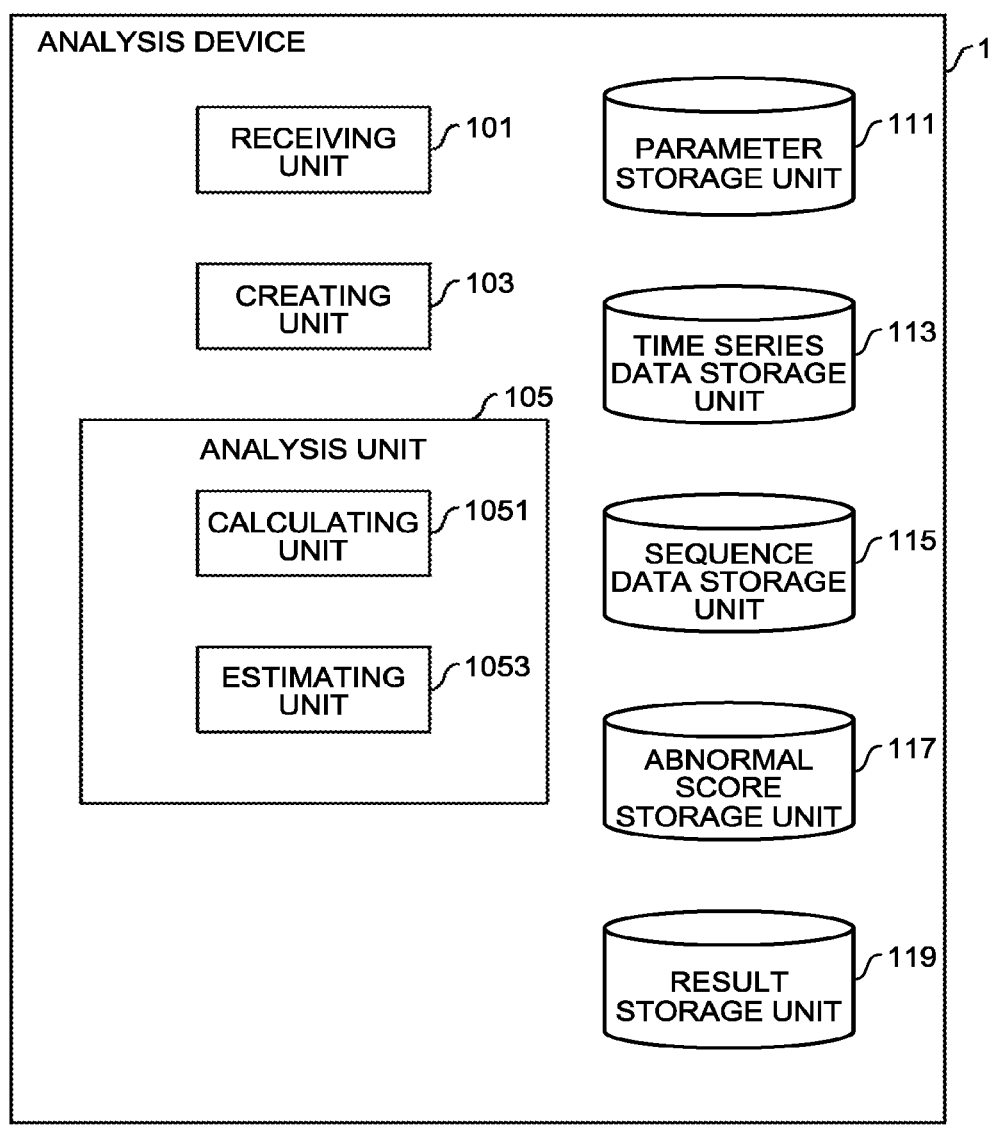
FIG. 7 is a functional block diagram of an analysis device.

FIG. 7 is a functional block diagram of an analysis device 1 that performs a process according to the embodiment. The analysis device 1 that is, for example, a server, a personal computer, or the like, includes a receiving unit 101, a creating unit 103, an analysis unit 105, a parameter storage unit 111, a time series data storage unit 113, a sequence data storage unit 115, an abnormal score storage unit 117, and a result storage unit 119. The analysis unit 105 includes a calculating unit 1051 and an estimating unit 1053.

Figure 20:
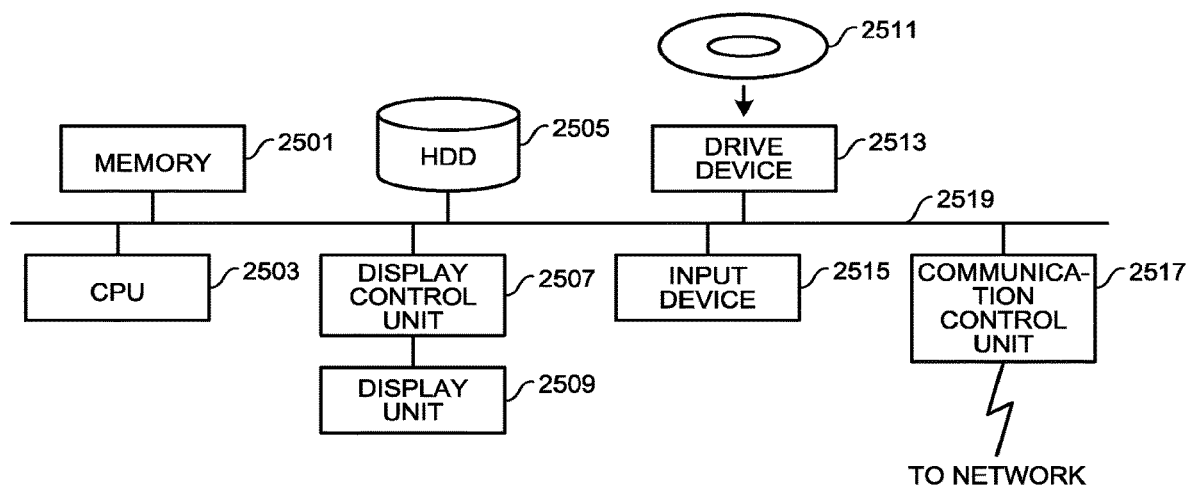
FIG. 20 is a functional block diagram of a computer.

The receiving unit 101, the creating unit 103, and the analysis unit 105 are implemented by, for example, a central processing unit (CPU) 2503 illustrated in FIG. 20 executing the program loaded in a memory 2501 illustrated in FIG. 20. The parameter storage unit 111, the time series data storage unit 113, the sequence data storage unit 115, the abnormal score storage unit 117, and the result storage unit 119 are provided in, for example, the memory 2501 or a hard disk drive (HDD) 2505 illustrated in FIG. 20.

The receiving unit 101 receives an input of a parameter (for example, a parameter used to calculate a Betti number, a parameter for a time series analysis, etc.) and stores the parameter in the parameter storage unit 111. The creating unit 103 creates, by using the parameters stored in the parameter storage unit 111 and the time series data stored in the time series data storage unit 113, the Betti number sequence that is the Betti numbers in time series and stores the created Betti number sequence in the sequence data storage unit 115. The calculating unit 1051 calculates abnormal scores by using the parameters stored in the parameter storage unit 111 and by using the data stored in the sequence data storage unit 115 and then stores the calculated abnormal scores in the abnormal score storage unit 117. The estimating unit 1053 performs, by using the parameters stored in the parameter storage unit 111 and the abnormal scores stored in the abnormal score storage unit 117, a process of detecting a change point and stores the processing result in the result storage unit 119.

Furthermore, the data stored in the time series data storage unit 113 is, for example, biometric data (time series data on the heart rate, brain waves, pulses, body temperatures, etc.), data measured by a sensor (time series data measured by a gyro sensor, an acceleration sensor, a magnetic field sensor, etc.), financial data (time series data on interest, commodity prices, balance of international payments, stock prices, etc.), natural environment data (time series data on air temperature, humidity, carbon dioxide concentration, etc.), social data (data on labor statistics, demographic statistics, etc.), or the like.

In the following, the process performed by the analysis device 1 will be described with reference to FIGS. 8 to 18. FIG. 8 is a diagram illustrating the processing flow of the process performed by the analysis device 1. As described above, in the process, the parameters stored in the parameter storage unit 111 are used; however, in the following, to simplify the description, descriptions of the parameters will be omitted.

The creating unit 103 in the analysis device 1 performs a sequence creating process that is a process of creating a Betti number sequence that is a time series of the Betti numbers (Step S1 illustrated in FIG. 8). The sequence creating process will be described with reference to FIGS. 9 to 16B.

First, the creating unit 103 reads the time series data stored in the time series data storage unit 113. The creating unit 103 creates, in accordance with the Takens' embedding theorem, a pseudo attractor from the read time series data (Step S21 illustrated in FIG. 9). Furthermore, strictly speaking, because a finite number of point sets created at Step S21 is not an "attractor", in the present specification, a point set created at Step S21 is referred to as a "pseudo attractor".

Creating a pseudo attractor will be described with reference to FIG. 10. For example, consider the time series data expressed by the function f(t) (t represents time) illustrated in FIG. 10. Furthermore, it is assumed that f(1), f(2), f(3), . . . , and f(T) are given as actual values. The pseudo attractor in the embodiment is a set of points in an N-dimensional space having a component of the value at a point N extracted from the time series data for each delay time $\tau(\tau \geq 1)$. Here, N represents an embedding dimension and, in general, N=3 or 4. For example, if N=3 and $\tau=1$, the following pseudo attractor including (T−2) points is created.

$$\{(f(1),f(2),f(3)),(f(2),f(3),f(4)),f(3),f(4),f(5)),\Lambda,(f(T-2),f(T-1),f(T))\} \quad (1)$$

Here, because $\tau=1$, elements are alternately extracted; however, for example, if $\tau=2$, a pseudo attractor including points (f(1), f(3), f(5)), points (f(2), f(4), f(6)), and . . . is created.

In the course of creating the pseudo attractor, effect of a difference in appearance due to the butterfly effect has been removed and the rule of a change in the original time series data is reflected in the pseudo attractor. Then, the similarity relationship between the pseudo attractors is equivalent to the similarity relationship between the rules. Accordingly, if a certain pseudo attractor and another pseudo attractor are similar, this means that the rules of the change in the original time series data are similar. Pseudo attractors that are similar with each other are created from the time series data in which the rules of the change are the same but phenomena (appearances) are different. Pseudo attractors that are different with each other are created from the time series data in which the rules of the change are different but phenomena are the same.

A description will be given here by referring back to FIG. 9. The creating unit 103 creates bar code data for each dimension of a hole (hereinafter, referred to as hole dimension) by performing a persistent homology process on the pseudo attractor created at Step S21 (Step S23).

The "homology" is a technique of representing the target feature by the number of holes in m (m≥0) dimension. The "hole" mentioned here is the source of a homology group, a zero-dimensional hole is a connected component, a one-dimensional hole is a hole (tunnel), and a two-dimensional hole is a cavity. The number of holes in each of the dimensions is referred to as the Betti number.

The "persistent homology" is a technique of characterizing the transition of an m-dimensional hole in the target (here, a set of points) and, by using persistent homology, it is possible to examine the feature related to the arrangement of points. In this technique, each of the points in the target is made to be gradually expanded to the spherical shape and the time point at which each of the holes is generated during that course (represented by the radius of the sphere at the birth time) and the time point at which each of the holes is vanished (represented by the radius of the sphere at the death time) are specified. Furthermore, the "time point" at which a hole is generated and the "time point" at which the hole is vanished in persistent homology are not correlated with the "time" in the time series data that is the source of creating the pseudo attractor.

Figure 11:
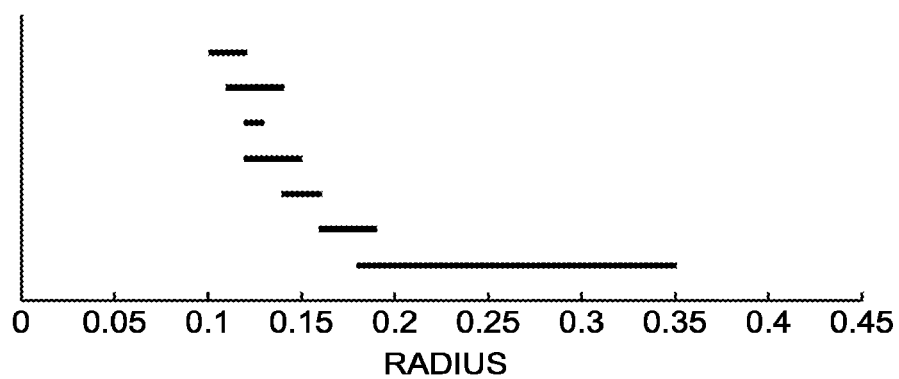
FIG. 11 is a bar code diagram.

By using the generated radius and the vanished radius of the holes, it is possible to create the bar code diagram illustrated in FIG. 11. In FIG. 11, the values on the horizontal axis represent the radius and each line segment is associated with a single hole. The radius associated with the left end of the line segment represents the generated radius of a hole and the radius associated with the right end of the line segment represents the vanished radius of the hole. The line segment is referred to as a persistent section. From this bar code diagram, for example, it is found that two holes are present when the radius is 0.18.

Figures 12, 13:
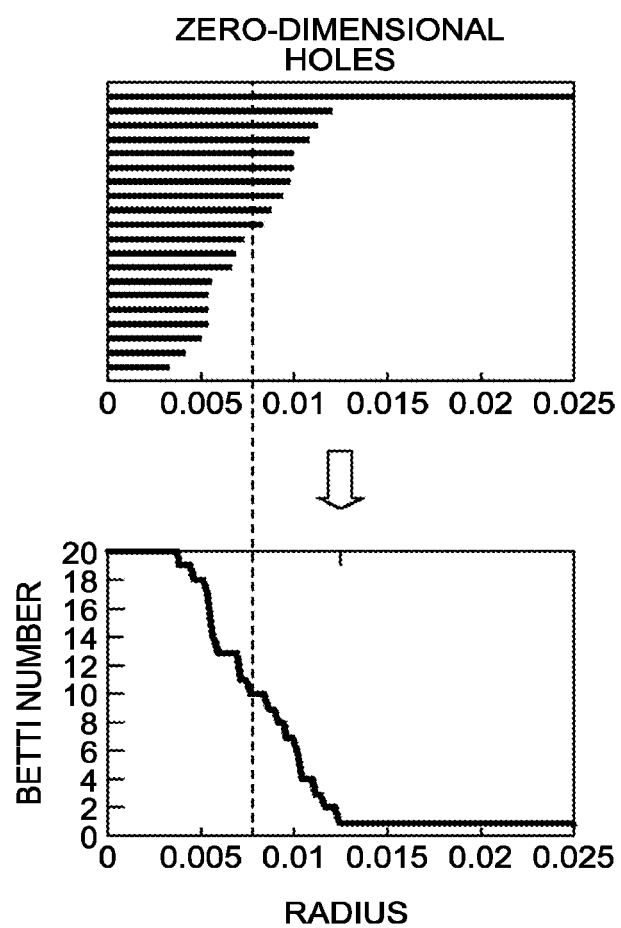
FIG. 12 is a diagram illustrating an example of bar code data.
FIG. 13 is a diagram illustrating the relationship between the bar code data and the Betti number sequence regarding a zero-dimensional hole.

FIG. 12 is a diagram illustrating an example of data (hereinafter, referred to as bar code data) used to create a bar code diagram. In the example illustrated in FIG. 12, values each representing the hole dimension, the radii of generated holes, and the radii of vanished holes are included. At Step S23, the bar code data is created for each hole dimension.

If the process described above is performed, the similarity relationship between the bar code data created from a certain pseudo attractor and the bar code data created from another pseudo attractor is equivalent to the similarity relationship between the pseudo attractors. Thus, if the pseudo attractors are the same, the pieces of created bar code data are the same, whereas, if the pseudo attractors are not the same, a difference is also generated in the bar codes except for the case in which pseudo attractors are slightly different.

Regarding persistent homology in detail, please refer to, for example, Yasuaki Hiraoka, "Protein Structure and Topology—An Introduction to persistent homology Group", Kyoritsu Shuppan Co., Ltd.

A description will be given here by referring back to FIG. 9. The creating unit 103 deletes the data in the persistent section with the length that is less than a predetermined length from the bar code data created at Step S23 (Step S25). The length of the persistent section is calculated by subtracting the generated radius from the vanished radius. The predetermined length is, for example, the length of time (hereinafter, referred to as a block) obtained by dividing the period of time from when a zero-dimensional hole is generated until when the hole is vanished into K equal parts. However, the length is not limited to a single block and the length of a plurality of blocks may also be set to a predetermined length.

Almost all holes that are vanished in a short period time after they were generated are generated from noise that is added to the time series data. If the data in a persistent section with the length that is less than the predetermined length is deleted, because the effect of noise can be alleviated, it is possible to improve the classification performance. However, it is assumed that the deletion target is the data in the persistent sections in one or higher dimensions.

If noise is generated, a hole in one or higher dimensions is sometimes generated for a short time. If the process at Step S25 is performed, the pieces of data created in both cases are almost the same; therefore, the effect of noise can be removed.

Furthermore, because the data in the persistent section with the length that is less than the predetermined length is deleted, the similarity relationship between the code data after the deletion is not exactly equivalent to the similarity relationship between the original bar code data. If deletion is not performed, the similarity relationships are equivalent.

A description will be given here by referring back to FIG. 9. The creating unit 103 creates, for each hole dimension, a Betti number sequence from each of the pieces of hole dimensional bar code data that has been subjected to the process indicated at Step S25 (Step S27). Then, the creating unit 103 stores the created Betti number sequences in the sequence data storage unit 115 and the process returns to the call source.

Figure 14:
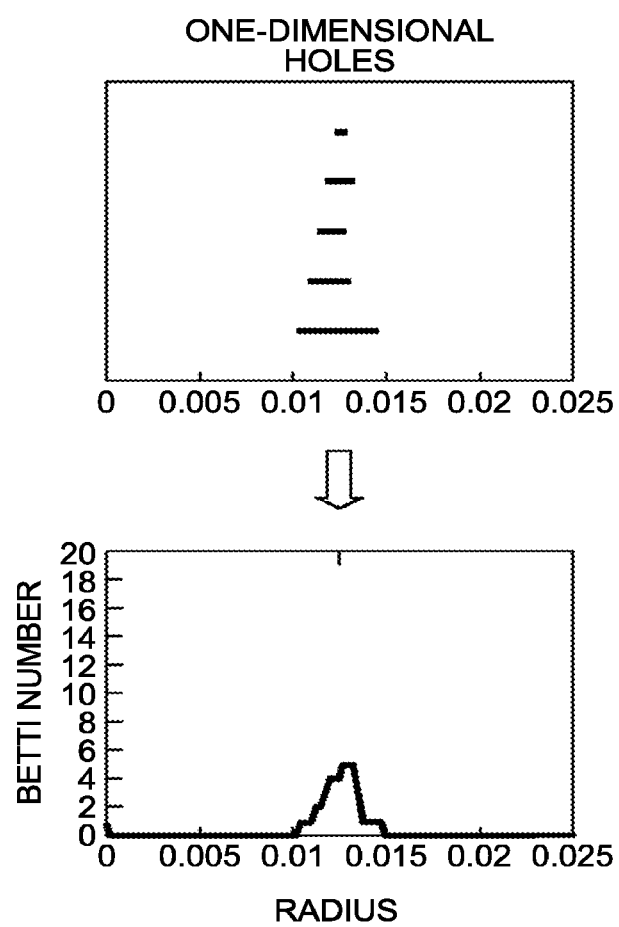
FIG. 14 is a diagram illustrating the relationship between the bar code data and the Betti number sequence regarding a one-dimensional hole.
Figure 15:
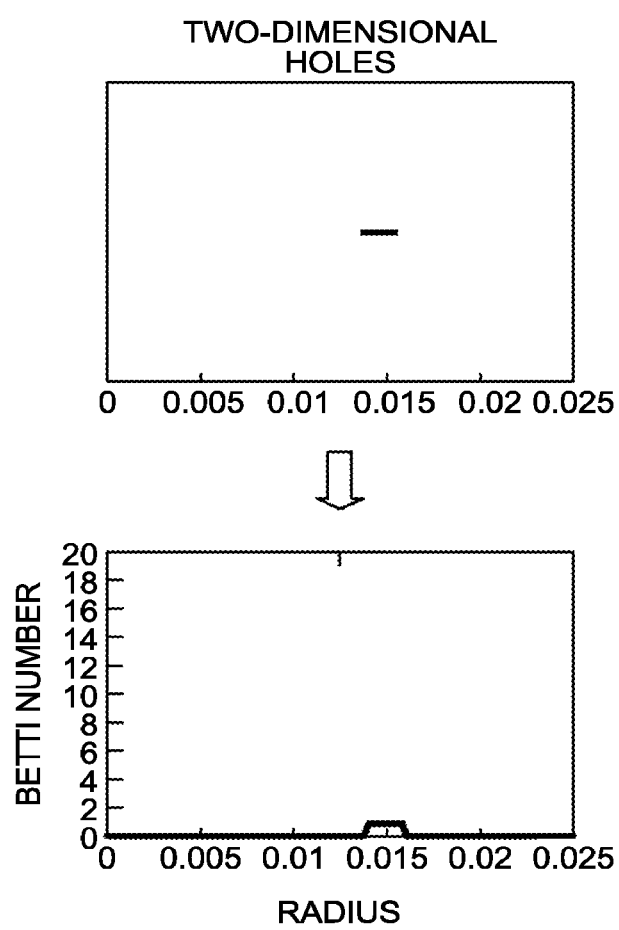
FIG. 15 is a diagram illustrating the relationship between the bar code data and the Betti number sequence regarding a two-dimensional hole.

As described above, because the bar code data is created for each hole dimension, the creating unit 103 creates the Betti number sequences from bar code data in each hole dimension. The Betti number sequence is data indicating the relationship between the radius (i.e., time) of the sphere of persistent homology and the Betti number. The relationship between the bar code data and the Betti number sequence to be created will be described with reference to FIGS. 13 to 15. FIG. 13 is a diagram illustrating the relationship between bar code data and the Betti number sequence regarding zero-dimensional holes, FIG. 14 is a diagram illustrating the relationship between the bar code data and the Betti number sequence regarding one-dimensional holes, and FIG. 15 is a diagram illustrating the relationship between the bar code data and the Betti number sequence regarding two-dimensional holes. In FIGS. 13 to 15, the graph on the upper portion is the graph created from the bar code data and the values on the horizontal axis represent the radii. The graph on the lower portion is the graph created from the Betti number sequence and the values on the vertical axis represent the Betti numbers and the values on the horizontal axis represent the radii. Because the Betti number represents the number of holes, for example, as illustrated in FIG. 13, the number of holes are 10 at the time of radius that is associated with the broken line indicated in the graph on the upper portion; therefore, in the graph on the lower portion, the Betti number associated with the broken line is also 10. The Betti number is counted for each block. As described above, because the radius is increased in accordance with the elapse of time in the persistent homology process, the Betti number sequence can be assumed to be time series data.

Basically, the same Betti number sequence can be obtained from the same bar code data. Namely, if the original pseudo attractors are the same, the same Betti number sequences can be obtained. However, there may be a rare case in which the same Betti number sequence is obtained from different bar codes.

Figure 16A:
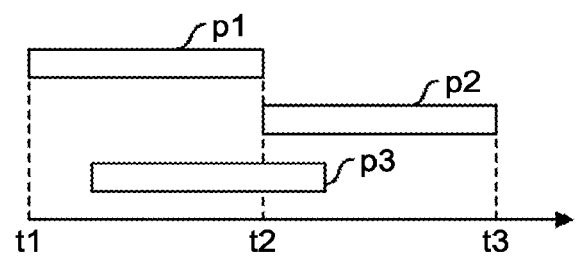
FIGS. 16A and 16B are diagrams illustrating an example of bar code data.
Figure 16B:
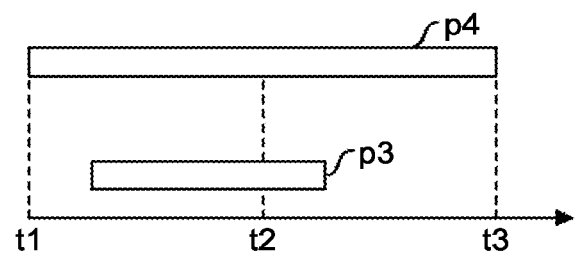

For example, consider the bar code data illustrated in FIGS. 16A and 16B. It is assumed that this bar code data is the data related to a one or higher dimensional hold. In the case of FIG. 16A, a persistent section p1 starts at time t1 and ends at time t2, whereas a persistent section p2 starts at time t2 and ends at time t3. In contrast, in the case of FIG. 16B, a persistent section p4 is started at time t1 and ended at time t3. It is assumed that a persistent section p3 in both cases is completely the same.

In this case, because completely the same Betti number sequences are obtained from the bar code data in both cases, depending on the Betti number sequence, both cases are not able to be distinguished. However, such a phenomenon is very unlikely to occur.

Accordingly, the similarity relationship between the Betti number sequence created from a certain bar code data and the Betti number sequence created from another bar code data is equivalent to the similarity relationship between the bar code data unless a rare case occurs. Based on the above description, although the definition of the distance between data is changed, the similarity relationship between the Betti number sequences created from the bar code data is almost equivalent to the similarity relationship between the original time series data.

As described above, is calculation of persistent homology is performed, it is possible to reflect the rule of a change in the original time series data represented by the pseudo attractor in the bar code data.

Calculation of persistent homology is a technique of topology and is used to analyze the structure of a static target represented by a set of points (for example, protein, crystallization of molecular, sensor networks, etc.). In contrast, in the embodiment, a point set (i.e., pseudo attractor) representing the rule of a change in data that is continuously changed in accordance with the elapse of time is used for the calculation target. In a case of the embodiment, because analyzing the structure of a point set itself is not the aim, the target and the aim are completely different from those used for the calculation of general persistent homology.

Furthermore, as described above, according to the embodiment, it is possible to remove the effect of noise included in time series data.

A description will be given here by referring back to FIG. 8. The calculating unit 1051 specifies, at Step S1, a single unprocessed hole dimension from among a plurality of hole dimensions associated with the Betti number sequence has been created (Step S3).

The calculating unit 1051 reads, from the sequence data storage unit 115, the Betti number sequence in hole dimension specified at Step S3. Then, regarding the read Betti number sequence, the calculating unit 1051 creates a history matrix and a test matrix (Step S5).

The calculating unit 1051 performs singular value decomposition on the history matrix created at Step S5 and performs singular value decomposition on the test matrix created at Step S5 (Step S7).

Regarding the history matrix, the calculating unit 1051 creates a matrix (hereinafter, referred to as a first matrix) having the component of left singular vectors included in the result of the singular value decomposition performed at Step S7 (Step S9).

Regarding the test matrix, the calculating unit 1051 creates a matrix (hereinafter, referred to as a second matrix) having the component of left singular vectors included in the result of the singular value decomposition performed at Step S7 (Step S11).

The calculating unit 1051 calculates an abnormal score that is based on the cosine similarity between the first matrix created at Step S9 and the second matrix created at Step S11 (Step S13). The calculating unit 1051 stores the calculated abnormal score in the abnormal score storage unit 117. Furthermore, the processes performed at Steps S5 to S13 are performed regarding each time t.

The processes performed at Steps S5 to S13 are the process of singular spectrum transformation. FIG. 17 is a diagram illustrating the singular spectrum transformation. In FIG. 17, the values on the vertical axis of the graph represent the values of time series data and the values on the horizontal axis of the graph represent time.

In the singular spectrum transformation, a plurality of sets of values of time series data in a sliding window is acquired and the history matrix and the test matrix each of which includes the plurality of acquired set are created. In the example illustrated in FIG. 17, a history matrix X(t) is created from the values included in the plurality of sets enclosed by a broken line 1701 and a test matrix Z(t) is created from the values included in the plurality of sets enclosed by a broken line 1702. An arrow 1703 represents lag and the lag is a nonnegative integer that defines the mutual position of the history matrix and the test matrix.

Based on the singular value decomposition performed on the history matrix X(t), the first matrix $\{u(t, 1), \ldots, u(t, r)\}$ is created by extracting r left singular vectors having higher singular values and gathering the extracted r left singular vectors as a set. Furthermore, based on the singular value decomposition performed on the test matrix Z(t), the second matrix $\{q(t, 1), \ldots, q(t, m)\}$ is created by extracting m left singular vectors having higher singular values and gathering the extracted m left singular vectors as a set.

The abnormal scores are calculated based on the cosine similarity between the first matrix and the second matrix; however, instead of cosine similarity, an abnormal scores may also be calculated based on the Euclidean distance, the Manhattan distance, dynamic time warping (DTW) distance, or the like. Furthermore, in general, the abnormal scores calculated at Step S13 are also referred to as the "degree of change".

The calculating unit 1051 determines whether an unprocessed hole dimension is present (Step S15).

If an unprocessed hole dimension is present (Yes route at Step S15), the process returns to Step S3.

In contrast, if no unprocessed hole dimension is present (No route at Step S15), the estimating unit 1053 performs the following process. Specifically, the estimating unit 1053 reads the abnormal scores stored in the abnormal score storage unit 117. Then, the estimating unit 1053 performs change point detection by using the read abnormal scores (Step S17). Then, the estimating unit 1053 stores the result of the change point detection (for example, information about time associated with a change point) in the result storage unit 119. Then, the process ends.

Figure 18:
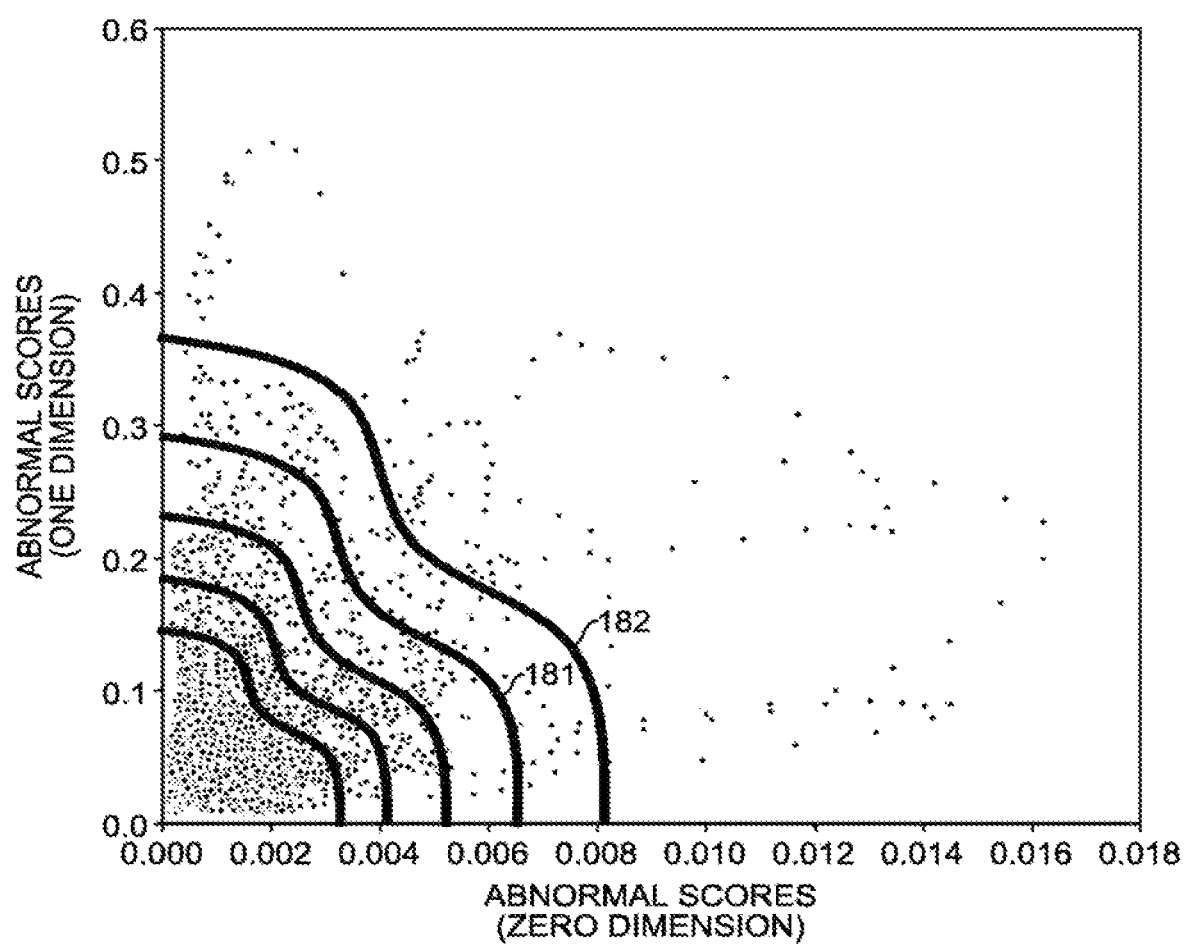
FIG. 18 is a diagram illustrating change point detection.

FIG. 18 is a diagram illustrating the change point detection performed at Step S17. In FIG. 18, the values on the horizontal axis represent the abnormal scores about zero dimension and the values on the vertical axis represent the abnormal scores about one dimension. Each point corresponds to a vector having the component of an abnormal score about zero dimension and an abnormal score about one dimension. In Step S17, a Wishart distribution in which the abnormal scores in each hole dimension is used for a random variable is estimated and change point detection is performed based on cumulative distribution probability of the Wishart distribution. A contour line 181 is a contour line in which the cumulative distribution probability is 90% and a contour line 182 is a contour line in which the cumulative distribution probability is 95%. For example, the time associated with the points included outside the contour line 182 (i.e., the side in which points are sparse) is detected as a change point.

Furthermore, a distribution other than the Wishart distribution may also be used for the probability distribution. For example, a multivariate probability distribution, such as a multivariate logarithm normal distribution or a Dirichlet distribution, in which the domain is non-negative may also be used.

When performing the process described above, the feature of the Betti number sequence in each hole dimension is considered, therefore; it is also possible to perform an appropriate time series analysis on the time series data having chaotic characteristics.

Figure 2:
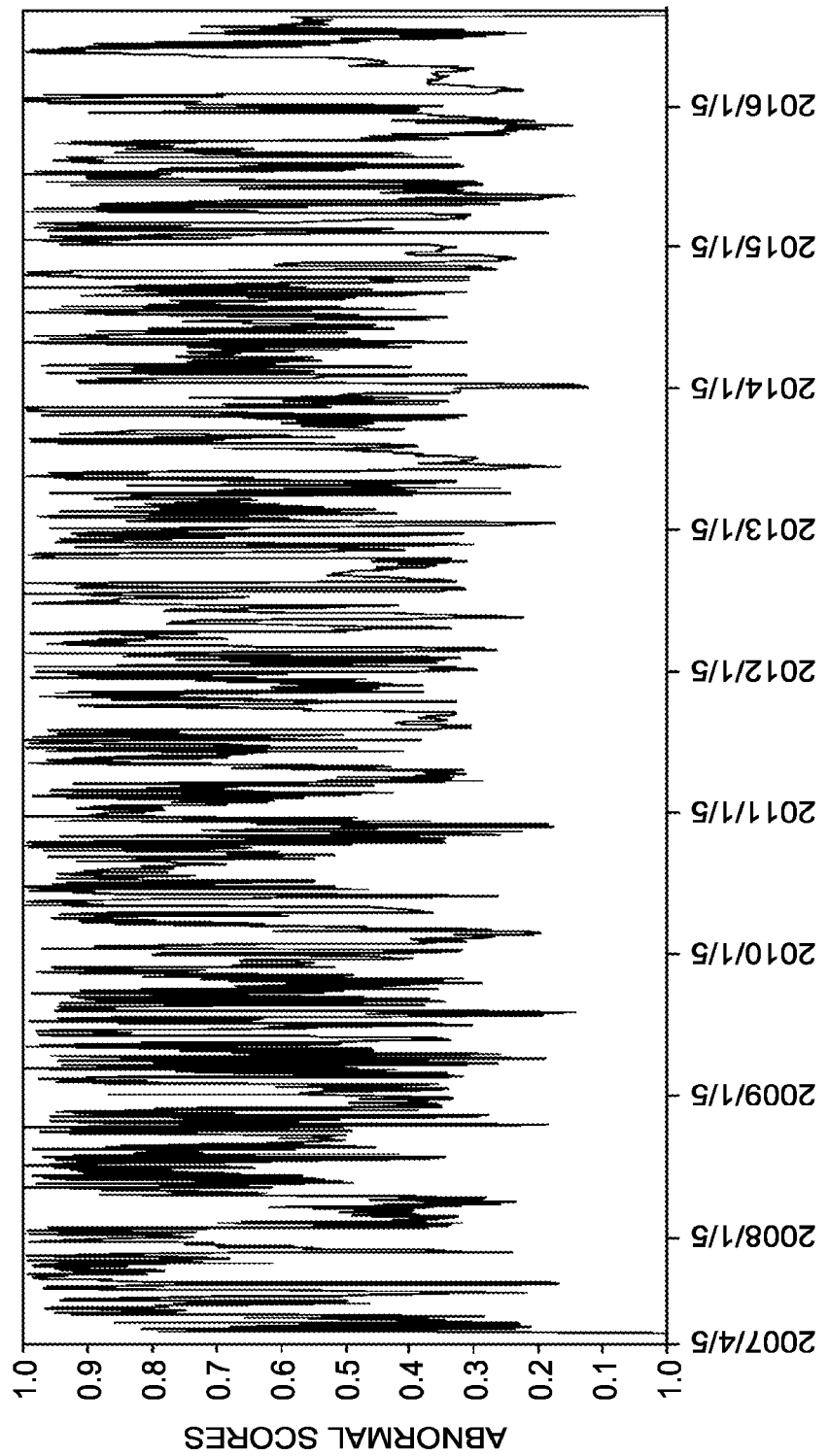
FIG. 2 is a diagram illustrating abnormal scores.

For example, in the examples described with reference to FIGS. 1 and 2, if singular spectrum transformation is performed on a logarithmic difference sequence of a stock price having wild fluctuations, because abnormal scores are changed at a high value, it is difficult to detect a change point.

Furthermore, in the examples described with reference to FIGS. 3 and 4, an abnormal score is calculated from a single Betti number sequence in which the Betti number sequences in each hole dimension are integrated. Accordingly, because the feature of the Betti number sequence about one or more dimensions is less likely to be reflected in change point detection due to the size of the scale of the Betti number sequences in each hole dimension, there may sometimes be a case in which an appropriate change point is not able to be performed.

In contrast, in the embodiment, because the original time series data is transformed to the Betti number sequences in each hole dimension and abnormal scores are calculated for each hole dimension, it is possible to perform the change point detection by considering the feature of a hole in each hole dimension. Furthermore, because the Betti number about zero dimension represents a connected component, the amplitude of or a variation in time series data is reflected in the Betti number sequence in zero dimension. Because the Betti number about one dimension represents the number of holes, two-dimensional structural mechanics is reflected in the Betti number sequence in one dimension. Because the Betti number about two dimensions represents the number of cavities, three-dimensional structural mechanics is reflected in the Betti number sequence in two dimensions.

Furthermore, according to the embodiment, for example, it is possible to detect a change in a physical condition from time series data on human brain waves, heart rate, pulse rate, and the like or it is possible to detect insider dealing from time series data on stock prices.

[b] Second Embodiment

A Betti time series can also be used other than the time series analysis. For example, in Non-Patent Document 1, a single Betti time series is created by integrating Betti time series in each hole dimension and machine learning is performed by inputting the created Betti time series. Accordingly, as an output of the sequence creating process performed by the analysis device 1, a single Betti time series obtained by integrating Betti time series in each hole dimension may also be created. In this case, the analysis device 1 performs a process that is different from the process performed in the first embodiment.

Figure 19:
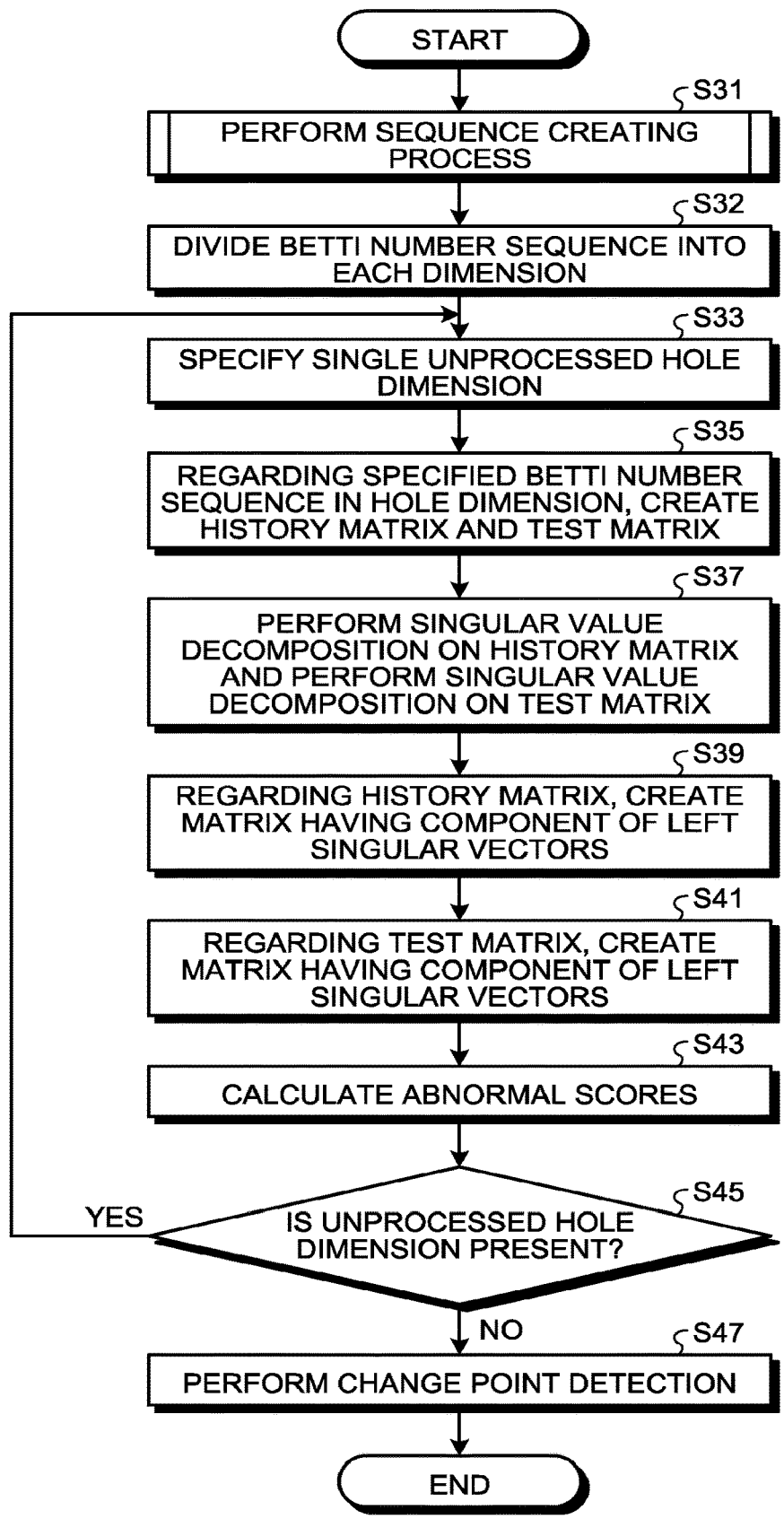
FIG. 19 is a flowchart illustrating the processing flow of a process performed by an analysis device according to a second embodiment.

FIG. 19 is a flowchart illustrating the processing flow of the process performed by the analysis device 1 when a single Betti number sequence is created as an output of the sequence creating process.

The creating unit 103 in the analysis device 1 performs the sequence creating process that is a process of creating a Betti number sequence that is the Betti numbers in time series (Step S31 illustrated in FIG. 19). The sequence creating process performed at Step S31 is basically the same as that performed at Step S1; however, a single Betti number sequence obtained by integrating Betti time series in each hole dimension is created as the final output. Namely, the Betti number sequence illustrated in FIG. 3 is created.

The calculating unit 1051 divides the single Betti number sequence created at Step S31 into each hole dimension (Step S32). Consequently, the Betti number sequence about zero dimension, the Betti number sequence about one dimension, the Betti number sequence about two dimensions, and the like are created.

The processes performed at Steps S33 to S47 are the same as those performed at Steps S3 to S17; therefore, descriptions thereof will be omitted.

When performing the processes described above, it is possible to perform an appropriate time series analysis even when a single Betti number sequence obtained by integrating Betti time series in each hole dimension is created in the sequence creating process.

An embodiment of the present invention has been described above; however, the present invention is not limited to this. For example, in some cases, functional block configuration of the analysis device 1 described above does not match the actual program module configuration.

Furthermore, the configuration of each table described above is an example and does not need to be configured described above. Furthermore, in also the processing flow, the order of the processes may also be swapped as long as the same process result can be obtained. Furthermore, the processes may also be performed in parallel.

Furthermore, the analysis device 1 described above is a computer device and, as illustrated in FIG. 20, the memory 2501, the CPU 2503, the HDD 2505, a display control unit 2507 connected to a display device 2509, a drive device 2513 for a removable disk 2511, an input device 2515, and a communication control unit 2517 that is used to connect to a network are connected by a bus 2519. An operating system (OS) and an application program for executing a process according to the embodiment are stored in the HDD 2505 and are read, when they are executed by the CPU 2503, from the HDD 2505 to the memory 2501. The CPU 2503 controls, in accordance with the processing content of the application program, the display control unit 2507, the communication control unit 2517, and the drive device 2513 so as to perform predetermined operations. Furthermore, the processing data is mainly stored in the memory 2501 but may also be stored in the HDD 2505. In the embodiment according to the present invention, the application program for executing the processes described above is stored in the computer readable removable disk 2511, is distributed, and is installed in the HDD 2505 from the drive device 2513. The application program is sometimes installed in the HDD 2505 by way of a network, such as the Internet, and the communication control unit 2517. The computer device described above implements various functions described above by cooperating with the hardware, such as the CPU 2503 and the memory 2501, with the program, such as the OS and the application program.

The embodiments according to the present invention described above can be summarized as follows.

The analysis method according to a first aspect of the embodiment includes a process (A) of dividing a Betti number sequence included in the result of the persistent homology process performed on time series data into a plurality of different-dimensional Betti number sequences and includes a process (B) of performing an analysis on each of the plurality of Betti number sequences.

This makes it possible to increase the target range in which the time series analysis is possible (for example, increase the type of time series data capable of performing the time series analysis).

Furthermore, the persistent homology process may also be a process of counting the Betti numbers in a case where the radius of a sphere having each point included in an attractor as the center is increased in accordance with elapse of time.

This makes it possible to appropriately create a Betti number sequence.

Furthermore, in the process of analysis, it may also possible to perform change point detection on time series data by performing (b1) singular spectrum transformation on each of the plurality of Betti number sequences.

However, the time series analysis other than change point detection may also be performed.

Furthermore, in the process of analysis, it may also possible to perform change point detection of time series data by (b2) creating a plurality of different-dimensional singular vectors from the history matrix and the test matrix of the plurality of Betti number sequences; by (b3) calculating, by using the created singular vector, abnormal scores about each of the plurality of dimensions; and by (b4) performing the change point detection on the time series data by using the abnormal scores calculated about each of the plurality of dimensions.

This makes it possible to detect an appropriate change point.

Furthermore, in the process of calculating an abnormal score, the abnormal scores may also be calculated based on (b31) cosine similarity, the Euclidean distance, the Manhattan distance, or the dynamic time warping (DTW) distance.

The analysis device according to the second aspect of the embodiment includes (C) a dividing unit that divides a Betti number sequence included in a result of the persistent homology process performed on time series data into a plurality of different-dimensional Betti number sequences (the calculating unit 1051 according to the embodiment is an example of the dividing unit described above) and (D) an analysis unit that performs an analysis on each of the plurality of Betti number sequences (the estimating unit 1053 according to the embodiment is an example of the analysis unit described above).

Furthermore, it is possible to create a program that causes a processor to execute the process used in the method described above and the program is stored in, for example, a computer readable storage medium or storage device, such as a flexible disk, a CD-ROM, a magneto-optic disk, a semiconductor memory, or a hard disk. Furthermore, an intermediate processing result is temporarily stored in a storage device, such as a main memory.

According to an aspect of an embodiment, it is possible to increase the target range in which a time series analysis is possible.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein an analysis program that causes a computer to execute a process comprising:
dividing, by a processor of the computer, a first Betti number sequence into a plurality of Betti number sequences, the first Betti number sequence being included in a result of a persistent homology process performed on a time series of biometric data including at least one of human brain waves, heart rate, pulse rate and body temperature, and each Betti number sequence of the plurality of Betti number sequences corresponding to a different dimension of the first Betti number sequence; and
performing, by the processor, a change point detection on the time series of biometric data by performing a singular spectrum transformation on each Betti number sequence of the plurality of Betti number sequences, while considering a feature of the Betti number sequence in each hole dimension to execute a time series analysis on the time series of biometric data having wild fluctuations and chaotic characteristics, wherein
the persistent homology process is a process of counting Betti numbers in a case where a radius of a sphere having each point included in an attractor as a center is increased in accordance with an elapse of time, and
the plurality of Betti number sequences are created by the processor, by using a parameter input and stored in a storage and the time series of biometric data measured by a sensor and stored in the storage.

2. The non-transitory computer-readable recording medium according to claim 1, wherein the performing the change point detection includes
creating a plurality of different-dimensional singular vectors from each of a history matrix and a test matrix of the plurality of Betti number sequences,
calculating, by using the created singular vectors, abnormal scores about each dimension of a plurality of dimensions, and
performing the change point detection on the time series of biometric data by using the abnormal scores calculated about each dimension of the plurality of dimensions.

3. The non-transitory computer-readable recording medium according to claim 2, wherein the calculating the abnormal scores includes calculating the abnormal scores based on cosine similarity, an Euclidean distance, a Manhattan distance, or a dynamic time warping (DTW) distance.

4. An analysis method, comprising:
dividing, by a processor a first Betti number sequence into a plurality of Betti number sequences, the first Betti number sequence being included in a result of a persistent homology process performed on a time series of biometric data including at least one of human brain waves, heart rate, pulse rate and body temperature, and each Betti number sequence of the plurality of Betti number sequences corresponding to a different dimension of the first Betti number sequence; and performing, by the processor, a change point detection on the time series of biometric data by performing a singular spectrum transformation on each Betti number sequence of the plurality of Betti number sequences, while considering a feature of the Betti number sequence in each hole dimension to execute a time series analysis on the time series of biometric data having wild fluctuations and chaotic characteristics, wherein the persistent homology process is a process of counting Betti numbers in a case where a radius of a sphere having each point included in an attractor as a center is increased in accordance with an elapse of time, and the plurality of Betti number sequences are created by the processor, by using a parameter input and stored in a storage and the time series of biometric data measured by a sensor and stored in the storage.

5. An analysis device, comprising:

a processor configured to:

divide a first Betti number sequence into a plurality of Betti number sequences, the first Betti number sequence being included in a result of a persistent homology process performed on a time series of biometric data including at least one of human brain waves, heart rate, pulse rate and body temperature, and each Betti number sequence of the plurality of Betti number sequences corresponding to a different dimension of the first Betti number sequence; and perform a change point detection on the time series of biometric data by performing a singular spectrum transformation on each Betti number sequence of the plurality of Betti number sequences, while considering a feature of the Betti number sequence in each hole dimension to execute a time series analysis on the time series of biometric data having wild fluctuations and chaotic characteristics, wherein the persistent homology process is a process of counting Betti numbers in a case where a radius of a sphere having each point included in an attractor as a center is increased in accordance with an elapse of time, and the plurality of Betti number sequences are created by the processor, by using a parameter input and stored in a storage and the time series of biometric data measured by a sensor and stored in the storage.

\* \* \* \* \*